United States Patent [19]

Terry

[11] 4,188,795
[45] Feb. 19, 1980

[54] HYDROGEN-HYDRIDE ABSORPTION SYSTEMS AND METHODS FOR REFRIGERATION AND HEAT PUMP CYCLES

[76] Inventor: Lynn E. Terry, 22 Suncrest Ave., Bridgeton, N.J. 08302

[21] Appl. No.: 969,468

[22] Filed: Dec. 14, 1978

Related U.S. Application Data

[63] Continuation of Ser. No. 838,106, Sep. 30, 1977, abandoned, which is a continuation-in-part of Ser. No. 715,231, Aug. 18, 1976, Pat. No. 4,055,962.

[51] Int. Cl.² ............... F25B 15/00; F01K 25/10
[52] U.S. Cl. ............................ 62/102; 62/114; 60/644; 62/467 R
[58] Field of Search ............... 62/102, 114, 467 R; 60/644, 655

[56] References Cited

U.S. PATENT DOCUMENTS

| | | | |
|---|---|---|---|
| 2,182,453 | 12/1939 | Sellew | 62/102 |
| 3,548,606 | 12/1970 | Kuerston | 62/114 |
| 3,943,719 | 3/1976 | Terry et al. | 60/644 |
| 3,957,473 | 5/1976 | Stark et al. | 62/114 |
| 4,111,002 | 9/1978 | Van Mal et al. | 62/514 R |

*Primary Examiner*—Lloyd L. King

*Attorney, Agent, or Firm*—William R. Laney

[57] ABSTRACT

Improved hydrogen-hydride absorption systems for improving the energy utilization in refrigeration and heat pump cycles comprise reactor systems for chemically forming three or more hydride components, means for supplying heat to and removing heat from the hydride in the respective systems, and means for conveying hydrogen between the several reactor systems.

A method for deriving improved heat pump effects from a narrowly temperature differential thermal source and sink by means of three or more hydride components is achieved by successive pressure staging between a series of hydride components over the narrow temperature range of the thermal source.

A method for deriving improved energy utilization of a high temperature thermal source for refrigeration by means of three or more hydride components is effected by cascading pressure differences between hydride components.

A method for the combined improvement of power production and thermal energy recovery at a higher intermediate temperature than the low temperature energy rejection of the power cycle by the heat pump effects, which method employs the cascading of pressure differences between hydride component systems.

18 Claims, 5 Drawing Figures

HYDROGEN-HYDRIDE ABSORPTION SYSTEMS AND METHODS FOR REFRIGERATION AND HEAT PUMP CYCLES

RELATED APPLICATIONS

This application is a continuation of Application Ser. No. 838,106, filed Sept. 30, 1977, now abandoned, which application is a continuation-in-part of my U.S. Application Ser. No. 715,231, filed Aug. 18, 1976, now U.S. Pat. No. 4,055,962, and entitled "HYDROGEN-HYDRIDE ABSORPTION SYSTEMS AND METHODS FOR REFRIGERATION AND HEAT PUMP CYCLES".

BACKGROUND OF THE INVENTION

1. Field of the Invention

This invention relates to cascaded pressure gradients and pressure staging in hydrogen absorption systems for improved energy utilzation resulting from the heats of absorption for heat effects, and from the heats of desorption for refrigeration.

2. Brief Description of the Prior Art

U.S. Pat. No. 3,943,719 describes hydride-dehydride-hydrogen (HDH) cycles used for the production of simultaneous and continuous power and refrigeration by means of thermochemical compression utilizing hydridable materials. For continuously supplying relatively high pressure hydrogen gas, a plurality of hydride-dehydride reactors are provided and are operated in out-of-phase or staggered sequence so that during the period when low-pressure, relatively cool hydrogen gas is being charged to one of the reactors, another is being activated and another is being dehydrided to produce high pressure hydrogen gas. The pressure energy of the gas thus developed in the hydride reactors is used for continuously developing power and refrigeration, following which the hydrogen gas, at reduced energy, is recycled to the reactors to recommence the HDH cycle. In order to chemically compress the hydrogen gas in the form of its hydride, a low-grade thermal source is utilized to supply heat to the several reactors.

In work carried on by Brookhaven National Laboratory for the United States Government, a high efficiency power conversion cycle, using hydrogen compressed by absorption on metal hydrides in a regenerative closed hydrogen Brayton cycle, has been proposed. In the cycle, hydrogen is thermochemically compressed using a low-temperature thermal energy source, such as geothermal or solar energy, is next regeneratively heated, and is then further heated by a high-temperature thermal source, such as fossil or nuclear energy, and then is expanded, reheated, and expanded again. The hydrogen is returned through the regenerators and then recompressed in the hydrides. Overall efficiency approaches 30 percent. However, high temperature energy efficiency, defined as the work output divided by the high temperature thermal input, approaches 90 percent.

In U.S. Application Ser. No. 715,231, filed on Aug. 18, 1976, now U.S. Pat. No. 4,055,962 hydrogen-hydride absorption systems are described which are comprised of two hydride components. Methods for deriving refrigeration and heat pump effects are described. One hydride component system operates as the equivalent of a mechanical refrigeration system. A low temperature thermal sink is provided by supplying the heat of desorption to a reactor of this hydride component system. The hydride component system then rejects energy as the heat of absorption at an intermediate temperature. The second hydride component system operates as the equivalent of a heat engine cycle. A thermal source at a relatively high temperature supplies the heat of desorption to this component system and heat is rejected as the heat of absorption at an intermediate temperature.

The Carnot cycle defines the limit of thermal efficiency not only for heat engine cycles and mechanical refrigeration cycles, but also for absorption cycles. The maximum efficiency for any cycle generating work from any thermal energy input is limited by the Carnot efficiency, which is defined as the net work produced, $W_{net}$, divided by the heat input, $Q_H$, and is equal to $(Q_H - Q_{Amb})/Q_H = W_{net}/Q_H = (T_H - T_{Amb})/T_H$, where $Q_{Amb}$ is the available ambient heat sink and $T_{Amb}$ is the ambient temperature. For mechanical refrigeration, the Carnot limit of thermal efficiency is defined as the heat absorbed by the cooling load, $Q_L$, divided by the net work input, $-W_{net}$, and is equal to $Q_L/(Q_{Amb} - Q_L) = Q_L/(-W_{net}) = T_L/(T_{Amb} - T_L)$. The maximum efficiency of an absorption cycle is thus defined, with the work output of the expansion device in the heat engine system equal to the work input of the compressor of the mechanical refrigeration system, and is therefore $Q_L/Q_H = (T_L/T_H)(T_H - T_{Amb})/(T_{Amb} - T_L)$. The higher the efficiency in the heat engine cycle, the lower the refrigeration load may be without significant energy costs. The high efficiency of the heat engine cycle requires a large temperature differential between a thermal source and a thermal sink.

In the method of operation of the heat pump absorption cycle, the heat engine cycle equivalent of one hydride component system operates from an intermediate temperature thermal source which provides the heat of desorption. The heat of absorption is rejected to a low temperature thermal source. The second component hydride system which operates as an equivalent mechanical refrigeration system has, as its refrigeration load, a thermal source at an intermediate temperature which provides the heat of desorption. The heat of absorption is rejected at a high temperature which is the heat pump effect.

A heat pump system is essentially a mechanical refrigeration system with a different objective in view. The rejected energy in the refrigeration cycle becomes useful energy. The heat input is to the evaporator from some ambient heat source. The efficiency is defined as the useful heat rejected, $Q_H$, divided by the net work input, $-W_{net}$, which is equal to $Q_H/-W_{net} = Q_H/(Q_H - Q_{Amb}) = T_H/(T_H - T_{Amb})$. If an absorption system is again considered as a combination heat pump and heat engine system, with the heat engine operating with a heat source at ambient conditions and a heat sink at some lower temperature $T_L$, the efficiency of the heat engine would be $Q'_{Amb}/W_{net} = Q'_{Amb}/(Q'_{Amb} - Q_L) = T_{Amb}/(T_{Amb} - T_L)$. The combined absorption system efficiency can be defined again with the work output of the heat engine system equal to the work input to the heat pump system as $Q_H/Q'_{Amb} = (T_H/T_{Amb})(T_{Amb} - T_L)/(T_H - T_{Amb})$, where the $Q'_{Amb}$ is only the heat input to the heat engine system.

In work carried out at the U.S. Government Naval Underwater Systems Center, a one component hydride system operating in a conventional heat pump cycle with mechanical compression of the hydrogen has been described in a paper of 1975. Dieter Gruen, et al., of Argonne National Laboratory, have described in a paper presented in April of 1975, a heat engine cycle based on hydrides which closely follows the concept in U.S. Pat. No. 3,943,719. In March of 1976, a two component hydride system operating non-continuously to produce heat pump effects at night from a solar system is described in Gruen. A refrigeration system is also alluded to briefly and broadly. In September of 1976, a third paper by Gruen et al. describes a continuous two component hydride system for producing refrigeration and heat pump effects. This work relates closely to the disclosure of U.S. patent application Ser. No. 715,231 filed on Aug. 18, 1976.

In U.S. patent application Ser. No. 715,231, the methods described are the most direct means of achieving refrigeration and heat effects when a temperature differential between a thermal sink and source is available. The higher the temperature of the heat effect, and the lower the temperature of the refrigeration sink, the larger the temperature differential of the thermal sink and source must be. The result is to have a high efficiency in the heat engine cycle by way of the large temperature differential of the thermal source and sink, thus allowing an efficient heat pump cycle to give a high temperature thermal source, or refrigeration at a low temperature sink.

With a small temperature differential between the thermal source and sink, the heat engine cycle is much less efficient but the heat effect or refrigeration can still be achieved at the expense of having larger heat inputs from the thermal source and larger heat outputs to the thermal sink. However, these larger thermal inputs and outputs need not be to disadvantage when such supplies are much more readily available than high temperature differences between the thermal sources and sink.

In the system disclosed in U.S. patent application Ser. No. 715,231, the energy utilization factor (E.U.F.) for the direct refrigeration cycle without pressure staging, is possibly as high as 3.0 if rejected thermal energy is used for such things as home heating. The useful energy would consist of 2 units of heat at an intermediate temperature and a unit of refrigeration at a low temperature, with only one unit of heat input at a high temperature. A pressure staged system would allow a higher E.U.F. of possibly 5.0 or higher. With a high temperature heat input of 1 unit at 290° F., three units of heat at 120° F. could be rejected and 2 units of refrigeration at 32° F. would be possible.

The combination of a pressure staging heat pump hydride cycle combined with a heat engine cycle would allow the heat engine cycle to operate at, for instance, a thermal input at 220° F. and heat rejection at 80° F. The pressure staging heat pump cycle, using the rejected heat as a heat input, would reject heat at 120° F. The high temperature heat input, being 1.40 units, would produce 1.20 units at 120° F. and 0.20 units of electrical output. This would be the maximum possible according to the first law of thermodynamics. If the heat engine cycle were to be made to operate between 220° F. and 80° F., instead of 220° F. and 120° F., the Carnot efficiency would be 15 percent instead of the 20 percent achieved—a 25 percent drop in the efficiency.

BRIEF DESCRIPTION OF THE PRESENT INVENTION

Improved absorption refrigeration and heat pump systems and methods for effective energy utilization are presented by this invention. Refrigeration and heating are continuously and efficiently generated directly from the heats of desorption and absorption, respectively, of three or more cascaded hydride component systems.

The improved refrigeration is achieved by cascading or paralleling operation of three or more hydride component systems so as to decrease the hydrogen pressure in stages over a relatively narrow temperature differential between thermal source and thermal sink. Each cascading between hydride components requires a thermal source at a relatively low temperature and a heat output at a slightly higher temperature. The entire cycle is completed by raising the last component hydride system to a much higher temperature so that the equilibrium pressure is great enough to hydride the first hydride component system in the process of cascading between hydride components.

The improved heat pump system works by pressure staging between hydride component systems so as to increase the hydrogen pressure. Each pressure stage between hydride components requires a thermal sink at a relatively low temperature, and a thermal source at a slightly higher temperature. The entire cycle is completed when the last hydride component system in the cascade has raised the hydrogen pressure sufficiently to hydride the first hydride component system in the pressure staging.

Another aspect of the invention allows for improved efficiency in heat engine cycles for the production of power by allowing them to operate with lower temperature thermal sinks. The use of the cascaded heat pump system with the thermally rejected energy of the heat engine cycle allows heat to be output at a higher temperature than the thermal sink, thus providing useful thermal sources.

The improved methods have advantage in the flexibility in which the system can be made and designed. Hydrogen is readily absorbed on an infinite number of alloys. Every alloy system has a broad range of equilibrium pressures and temperatures as compositions of the alloys in the alloy system are changed. Therefore almost any desired pressure range or almost any temperature range can be designed to achieve heat effects or refrigeration. Conventional absorption systems do not possess these design capabilities.

DETAILED DESCRIPTION OF PREFERRED EMBODIMENTS OF THE INVENTION

Figure 1:
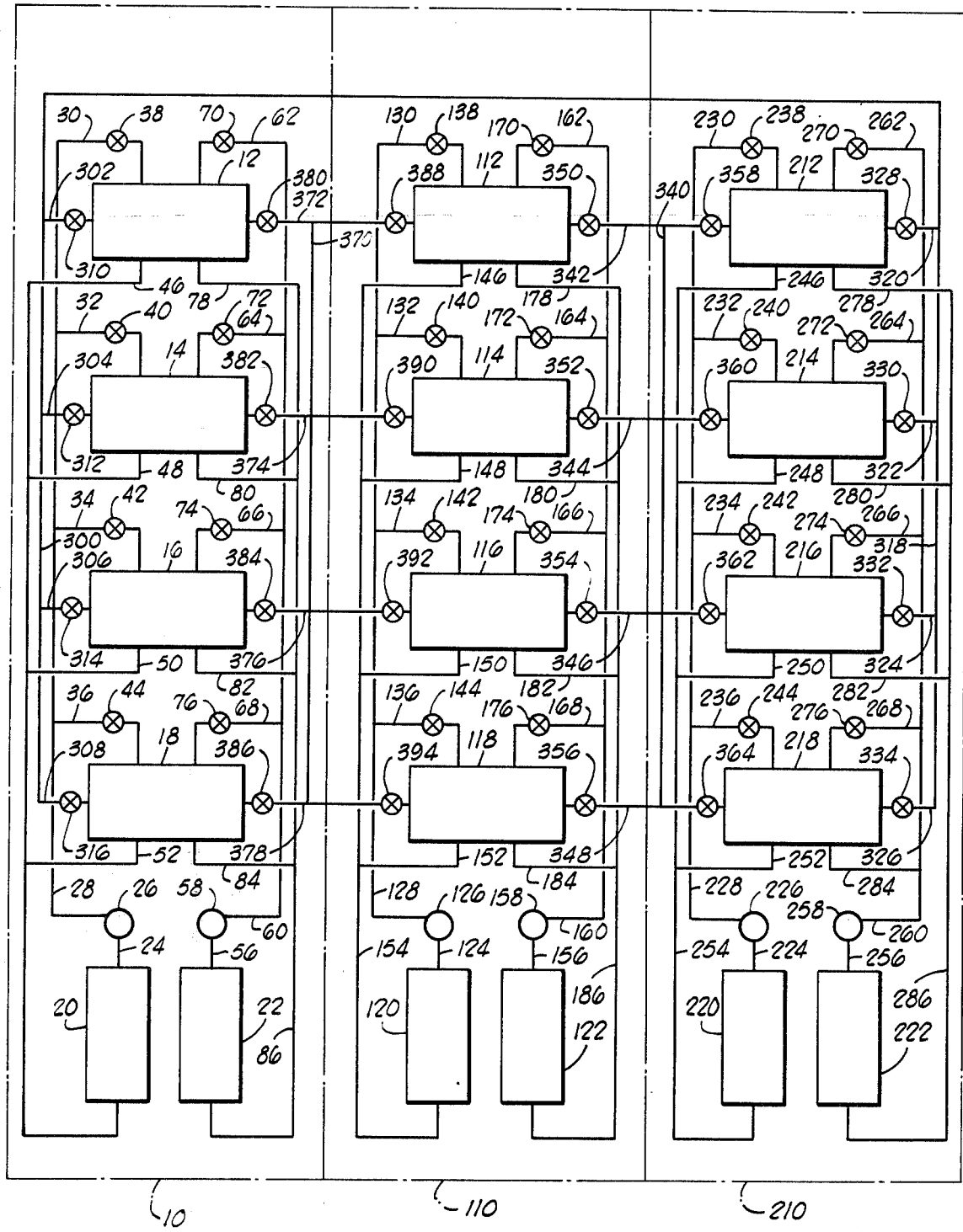
FIG. 1 is a schematic flow diagram illustrating three hydrogen-hydride absorption component systems and associated heat exchangers.

Referring initially to FIG. 1 of the drawings, three identical hydride reactor systems 10, 110, 210 (sometimes hereinafter referred to as subsystems where the entire collective array is referred to as the system), each containing a different hydriding material, are illustrated, with hydride reactors 12, 14, 16 and 18 in system 10, hydride reactors 112, 114, 116 and 118 in system 110, and hydride reactors 212, 214, 216 and 218 in system 210. The heats of absorption and heats of desorption are removed or supplied, respetively, from reactors in system 10 by heat exchangers 20 and 22, from reactors in system 110 by heat exchangers 120 and 122, and from reactors in system 210 by heat exchangers 220 and 22. Heat exchangers 20, 22, 120, 122, 220 and 222 are holding tanks for a liquid which will not dissolve hydrogen. The hydrogen gas of the absorption systems is bubbled through the liquid in order to be cooled or heated, depending on whether the circulating hydrogen gas is to remove the heat of absorption from the reactor systems or is to provide the heat of desorption. By bubbling hydrogen gas through a liquid such as deaerated water, there is direct contact between the hydrogen gas and liquid and therefore a very high heat transfer rate. Since the heat transfer is the limiting rate for hydridiing reactors where heat transfer is by conduction, heat transfer by direct flow over the large surface area of the hydriding alloy and through the liquid will substantially decrease cycling time.

For purposes of illustration, the refrigeration mode of operation will first be described. This requires a high temperature thermal input into hydride component system 10 by means of heat exchanger 20. Relatively high temperature hydrogen gas is supplied through conduit 24 to circulator pump 26. The hydrogen gas pressure must be above the equilibrium pressure of the hydriding alloy in system 10 in order for the gas to circulate through this system. Circulator pump 26 compresses the hydrogen gas to a pressure sufficient to accomplish this. The circulating hydrogen gas is charged to system 10 through manifold 28 and is admitted, in a sequence hereinafter described, to the reactors 12-18 through branch conduits 30, 32, 34, and 36 via valves 38, 40, 42, and 44, respectively. Reactors 12-18 are connected by branch return conduits 46, 48, 50 and 52, respectively, to return manifold 54.

The heat of absorption is removed from system 10 by means of circulating low pressure hydrogen gas through heat exchanger 22. Circulator pump 58 is supplied with hydrogen gas via conduit 56. System 10 is supplied with the circulating hydrogen gas by means of manifold 60 and the hydrogen gas is admitted, in a sequence hereinafter described, to the reactors 12-18 through branch conduits 62, 64, 66, and 68, respectively, containing valves 70, 72, 74 and 76. Branch return conduits 78, 80, 82 and 84 are connected to return manifold 86.

Hydride component reactor systems 110 and 210 consist of systems equivalent to hydride component system 10. Systems 110 and 210 serve as the equivalent of the mechanical refrigeration system and therefore must have heat supplied as the heat of desorption at a relatively low temperature to each of the systems. Heats of absorption are removed at a relatively higher temperature from each of systems 110 and 210. System 10 serves as the heat engine equivalent with the heat of absorption supplied at a relatively high temperature and with heat rejected at some lower temperature.

Hydride component systems 110 and 210 have heat exchangers 120 and 220 which serve to remove the heats of absorption from the hydrogen gas at a temperature intermediate to that of the high temperature input to system 10 and the low temperature refrigeration load. Hydrogen gas is circulated from heat exchanger 120 through conduit 124 by circulator 126 and supplied to system 110 via manifold 128. Hydrogen is charged to reactors 112-118 by branch conduits 130, 132, 134, and 136 via valves 138, 140, 142, and 144, respectively. Branch return conduits 146, 148, 150, and 152 are connected to return manifold 154. In system 210, the circulator pump 226 is supplied with hydrogen gas from heat exchanger 220 through conduit 224. Circulator pump 226 supplies hydrogen gas to manifold 228 and the gas is charged to reactors 212-218 by branch conduits 230, 232, 234, and 236 via valves 238, 240, 242, and 244, respectively. Hydrogen gas is returned by branch return conduits 246, 248, 250, and 252 to return manifold 254 in system 210.

The refrigeration is achieved by supplying the heats of desorption to systems 110 and 210 at a relatively low temperature by heat exchangers 122 and 222, respectively. In system 110, the hydrogen gas is supplied to circulator 158 by conduit 156. The hydrogen gas is charged to manifold 160 which supplies the reactors 112-118 through branch supply conduits 162, 164, 166 and 168 via valves 170, 172, 174, and 176, respectively. The hydrogen gas is returned by means of return conduits 178, 180, 182, and 184 to return manifold 186. In system 210, circulator pump 258 supplies hydrogen gas to manifold 260 via conduit 256. Manifold 260 supplies reactors 212-218 via conduits 262, 264, 266, and 268 through valves 270, 272, 274, and 276, respectively. Hydrogen is returned to manifold 286 through conduits 278, 280, 282, and 284.

In the heat pump mode of operation, systems 110 and 210 serve as the equivalent to the heat engine cycle. Operating within a small temperature differential between thermal source and sink, the heat engine cycle is inefficient. Therefore pressure staging to increase the pressure so that system 10 may be hydrided at a relatively high temperature is used between systems 110 and 210. System 10 is the equivalent of the mechanical refrigeration system and supplies the heat pump effect. Heat exchanger 122 serves to remove the heat of absorption from system 110 as does heat exchanger 222 in system 210. Heat is supplied as the heat of desorption to system 110 by heat exchanger 120 and to system 210 by heat exchanger 220. The heat pump effect is achieved by removing the heat of absorption from heat exchanger 20 in system 10. Heat of desorption is supplied to system 10 by heat exchanger 22.

Hydrogen is conveyed between reactors of systems 10, 110, and 210 via manifolds 300, 318, 340 and 370. Reactors 12-18 of system 10 are connected to manifold 300 by conduits 302, 304, 306, and 308, respectively, and containing valves 310, 312, 314, and 316. Manifold 318 is connected to reactors 210-218 via conduits 320, 322, 324, and 326, respectively, containing valves 328, 330, 332, and 334, respectively. Reactor systems 110 and 210 are interconnected by manifold 340 which is connected to reactors 112 and 212 by conduit 342 which contains valves 350 and 358. Reactors 114 and 214 are connected by conduit 344 which contains valves 352 and 360. Reactors 116 and 216 are connected by conduit 346 which contains valves 354 and 362. Finally the reactors 118 and 218 of systems 110 and 210 are connected to manifold 340 by conduit 348 which contains valves 356 and 364. Reactor systems 10 and 110 are connected by manifold 370. Conduit 372 interconnects manifold 370 to reactors 12 and 112 and contains valves 380 and 388. Reactors 14 and 114 are connected to the manifold 370 by conduit 374 which contains valves 382 and 390. Reactors 16 and 116 are connected by conduit 376 which contains valves 384 and 392. Finally the last two reactors of system 10 and 110 are connected to manifold 370 by conduit 378 which contains valves 386 and 394.

One manner in which systems 10, 110, and 210 may be operated in order to maintain continuous refrigeration or heat pump effects is by the phase sequence given in Table I. This sequencing to provide continuous operation is explained in detail in reference to the hydriding-dehydriding reaction in U.S. Pat. No. 3,943,719.

Table I

| Reactor | Phase I | Phase II | Phase III | Phase IV |
|---|---|---|---|---|
| 12 | Dehydriding | Deactivating | Hydriding | Activating |
| 14 | Deactivating | Hydriding | Activating | Dehydriding |
| 16 | Hydriding | Activating | Dehydriding | Deactivating |
| 18 | Activating | Dehydriding | Deactivating | Hydriding |
| 112 | Dehydriding | Deactivating | Hydriding | Activating |
| 114 | Deactivating | Hydriding | Activating | Dehydriding |
| 116 | Hydriding | Activating | Dehydriding | Deactivating |
| 118 | Activating | Dehydriding | Deacivating | Hydriding |
| 212 | Hydriding | Activating | Dehydriding | Deactivating |
| 214 | Activating | Dehydriding | Deactivating | Hydriding |
| 216 | Dehydriding | Deacivating | Hydriding | Activating |
| 218 | Deactivating | Hydriding | Activating | Dehydriding |

Preferably, the hydride material in the reactors is a solid powdered material capable of reacting with hydrogen in a reversible hydriding reaction. The solid materials offer a distinct advantage over conventional absorption systems in that the working fluid, hydrogen, is easily separated from the absorbent, the hydride material, without distillation or other separation processes. It is necessary that the hydride materials of systems 10, 110, and 210 be different. These materials may be of the same alloy class, but the specific alloy compositions must be different in order that different equilibrium pressure-temperature relationships exist. Alloys which may be used in the reactor systems include, but are not limited to, nickel-magnesium alloys, iron-titanium alloys, copper-magnesium alloys, vanadium-silicon alloys, lanthanum-nickel alloys, lanthanum-cobalt alloys, calcium-nickel alloys, and alloys of the generic formula $RT_5$, where R is a rare earth iron, and T is a 3d-transition metal ion.

With respect to the characteristic response of hydridable materials to exposure to hydrogen gas under varying conditions of temperature and pressure, the relationship of the equilibrium pressure to the equilibrium temperature over the phase transition from base material to hydrided base material, and the reverse reaction, is expressed by the empirical equation $$\ln P_{eq} = \frac{-A}{T_{eq}} + B$$

where $P_{eq}$ is the equilibrium pressure of hydrogen in atmospheres, $T_{eq}$ is the corresponding equilibrium temperature in degrees Kelvin, A is a constant with dimensions of temperature, and B is a constant without dimensions. On the basis of the specified equation, which is characteristic of materials which undergo hydriding to an equilibrium state upon exposure to hydrogen gas, the preferred hydridable materials for use in the present invention can be determined. Such materials are those which will supply the necessary pressure differences between the reactors of systems 10, 110, and 210 over the desired operation temperatures of the refrigeration and heat pump modes of operation. The empirical equation is usually a best fit for the equilibrium data of absorption and desorption. Hysteresis is demonstrated in that, for the same equilibrium temperature, the equilibrium pressure for absorption is sometimes higher than that for desorption. An inefficiency is also demonstrated in that upon hydriding, the equilibrium pressure may increase for the same equilibrium temperature as the equilibruim hydride phase is approached. The reverse is also true in that, upon dehydriding, the equilibrium pressure may decrease at the same equilibrium temperature of absorption as the equilibrium base material phase is approached. In the specified equation, the constant A is related to the heat of absorption by being equal to the heat of formation divided by the universal gas constant. With a phase diagram or a chemical equation describing the phase reaction and the empirical equation, the refrigeration or heat pump system of the present invention can be readily designed.

To explain the overall operation of a cycle, the refrigeration mode of operation of the systems illustrated in FIG. 1 will be described. In the operation of the refrigeration cycle, system 10 serves as the equivalent of a heat engine cycle. Therefore system 10 must be supplied with a relatively high temperature thermal input and must reject heat at a relatively lower temperature. Systems 110 and 210 serve as the equivalent of a mechanical refrigeration system and therefore there must be a thermal input at a relatively low temperature and heat must be rejected at a higher temperature.

Reactors 12–18, 112–118, and 212–218 are operated in a staggered sequence with each reactor in each system undergoing a hydriding, activating, dehydriding and deactivating phase during each cycle of operation, as shown in Table I. In order to further explain the overall operation of the systems, reactors 12 and 212, reactors 216 and 116, and reactors 112 and 16 will initially be described before discussing the alternating sequence in which the other reactors are operated.

The hydridable material contained in the reactors of system 10 is assumed to be the alloy $CaNi_5$. The reactors of system 110 are assumed to contain the alloy $Ca_{0.7}M_{0.3}Ni_5$ where M stands for Mischmetal of rare earths. The reactors in system 210 contain the alloy $Ca_{0.4}M_{0.6}Ni_5$.

At the outset, reactor 12 in system 10 will be considered to be in a fully hydrided and activated state, i.e., a hydride of the alloy $CaNi_5$ has been formed and the temperature of the reactor has been heated to 474° K. (290° F.). Reactor 212 of system 210 is in a fully dehydrided and deactivated state, i.e., a hydride of the alloy $Ca_{0.4}M_{0.6}Ni_5$ has not been formed, and the temperature of reactor 210 is 322° K. (120° F.).

At this time hydrogen gas from heat exchanger 20 is circulated by circulator 26 through manifold 29 to reactor 12 via the branch conduit 30 and through open valve 38. The hot hydrogen gas supplies the heat of desorption to reactor 12. Valves 70 and 380 are closed at this time. At the commencement of the dehydriding phase, valve 310 is opened to permit hydrogen to flow to reactor 212 to commence hydriding in a manner to be described next. The hydrogen pressure supplied by reactor 12 is typically 58 atmospheres and a temperature of 474° K. The dehydriding reaction of the CaNi₅ hydride requires 16,000 Joules/gm H$_2$ of thermal energy to effect dehydriding.

At the same time as reactor 12 is dehydriding, reactor 212 is hydriding by absorption of hydrogen gas from manifold 318 through open valve 328 in branch conduit 320. The reaction evolves heat of 11,300 Joules/gm H$_2$. This thermal energy is removed from reactor 212 by circulating hydrogen gas by means of circulator 226 which supplies manifold 228. The hydrogen gas is admitted through branch conduit 230 through open valve 238. Valves 270 and 358 are closed at this time.

Concurrent to the operations of reactors 12 and 212, reactor 216 is dehydriding and the evolved hydrogen gas is absorbed by reactor 116. Hydrogen gas supplied by circulator 258 is charged to manifold 260 and director to reactor 216 through branch conduit 266 and open valve 274. Valve 362 is open to conduit 346 which delivers the desorbed hydrogen gas to reactor 116 of system 110. Valves 242 and 332 are closed at this time. The circulating hydrogen gas is supplying the heat of desorption of 11,300 Joules/gm H$_2$ at a temperature of 273° K. (32° F.). The hydrogen pressure in reactor 216 is slightly higher than 10 atmospheres. The hydrogen gas released from reactor 216 is absorbed in the alloy in reactor 116. The evolved heat of reactor 116 is at a temperature of 322° K. (120° F.) maintained by circulating hydrogen gas from heat exchanger 120. Circulator pump 126 supplies hydrogen to manifold 128, and the gas is then routed to reactor 116 via branch conduit 134 and open valve 142. Valve 354 is opened so as to receive the hydrogen gas from reactor 216. Valves 174 and 392 are closed at this time. The heat of absorption of reactor 116 is 13,600 Joules/gm H$_2$.

In this same phase of operation, reactor 112 is dehydriding and reactor 16 is hydriding. These two reactors improve energy utilization over U.S. patent application Ser. No. 715,231.

Reactor 112 is dehydriding by supplying to it thermal energy of 13,600 Joules/gm H$_2$ at 273° K. (32° F.). Reactor 16 is hydrided at 322° K. (120° F.) and releases the heat of absorption of 16,000 Joules/gm H$_2$.

The dehydriding of reactor 112 is caused by circulating hydrogen gas from heat exchanger 122 at a temperature of 273° K. by means of circulator pump 158 which charges manifold 160. Circulating hydrogen gas enters reactor 112 through branch conduit 162 and open valve 170. The hydrogen gas released upon desorption is discharged through open valve 388 to manifold 370 at a pressure of 1.5 atmospheres. Valves 138 and 350 are closed. Hydrogen from manifold 370 is admitted to reactor 16 through conduit 376 and open valve 384. The heat of absorption is removed by circulating hydrogen gas to reactor 16 from heat exchanger 22 at 322° K. Circulator pump 58 discharges the gas to manifold 60 which supplies reactor 16 through conduit 66 and open valve 74. Valves 42 and 314 are closed.

The next phase for the reactors begins when reactors 12, 112, and 216 are fully dehydrided and their deactivation is commenced. Deactivation requires that the pressure in these reactors be adjusted so that these reactors can be hydrided in the next phase. Deactivation is done by bringing the rectors to the hydriding temperature. This could be done as a heat recovery step, in the manner referred to in U.S. patent application Ser. No. 715,231. Deactivation may also be considered, however, as a part of the hydriding step. The valving status necessary to do this will be discussed next. The activation step for reactors 16, 116, and 212 may also be a heat recovery step, and may be referred to in U.S. patent application Ser. No. 715,231. Activation may also, however, be considered as part of the dehydriding step and the valving to do this will also now be discussed.

This next phase is a hydriding phase for reactors 12, 112, and 216 and a dehydriding phase for reactors 16, 116, and 212. Looking at reactors 16 and 216 first, reactor 16 dehydrides onto reactor 216. The states of the hydrogen gas leaving reactor 16 are the same as when reactor 12 was dehydriding, described above. The hydrogen gas from heat exchanger 20 is charged by circulator pump 26 to manifold 28 which supplies reactor 16 through conduit 34 and open valve 42. Valves 74 and 384 are closed. Valve 314 is opened to manifold 300 and desorbed hydrogen is charged to reactor 216 through manifold 318 and the open valve 332 contained in conduit 324. The heat of absorption in reactor 216 is removed by heat exchanger 220. Hydrogen gas is circulated by circulator pump 226 to manifold 228 which supplies reactor 216 through open valve 242 in conduit 234.

As reactor 212 dehydrides, hydrogen gas therefrom is charged to reactor 112. Thermal energy at 273° K. is supplied by heat exchanger 222 by means of circulator pump 258 as hydrogen gas is circulated to reactor 212 through manifold 260 and branch conduit 262 which contains the open valve 270. Valves 238 and 328 are closed. Desorbed hydrogen gas from reactor 212 at a pressure of 10 atmospheres is charged to reactor 112 through conduit 342 and through open valves 358 and 350. The heat of absorption at 322° K. of reactor 112 is removed by the circulating hydrogen gas from heat exchanger 120. Circulator pump 126 charges manifold 128 and the hydrogen gas is directed to reactor 112 through branch conduit 130 and open valve 138.

As reactor 116 dehydrides, hydrogen gas therefrom is charged to reactor 12. Thermal energy at 273° K. is supplied to reactor 116 from heat exchanger 122 by means of circulator pump 158, manifold 160 and branch conduit 166 which contains open valve 174. Desorbed hydrogen gas from reactor 116 is charged to reactor 12 by way of conduit 372, manifold 370 and conduit 376, with the valves 380 and 392 being open. The heat of absorption of reactor 12 is removed through heat exchanger 22 to which the hydrogen heat transfer gas is circulated by circulator pump 58 through manifold 60 and the open valve 70 in branch conduit 62.

The final phase for reactors 12, 112, and 216 is the activation phase and for reactors 16, 116, and 212 is the deactivation phase. The activation phase may again be considered part of the dehydriding phase, which is the next phase in a new cycle for reactors 12, 112, and 216. The deactivation phase may be considered as part of the hydriding phase for reactors 16, 116, and 212. The hydriding phase is the next phase in a new cycle for reactors 16, 116, and 212.

The four phases of hydriding, activation, dehydriding, and deactivation that have been described for reactors 12, 16, 112, 116, 212 and 216, as the reactors go through a complete cycle for the refrigeration mode, are also characteristic of the sequential steps for the remaining reactors in systems 10, 110, and 210. By properly synchronizing the operation of the reactors in systems 10, 110, and 210, a continuous heat sink from heat exchangers 122 and 222 is available. Also potentially useful thermal sources for heating at 322° K. are available from heat exchangers 22, 120, and 220. The sequential steps in one complete cycle for each reactor has been previously cited in Table I. In order to more fully explain and clarify the synchronization and sequential operation of the valves during the refrigeration mode of operation, Table II is provided to show the status of the various valves used in controlling flows of the hydrogen gases between heat exchangers and reactors.

ation mode of operation, the $CaNi_5$ hydride would be dehydrided at the temperature of 474° K. and 58 atmospheres with a thermal input of 16,000 Joules/gm $H_2$. The hydrogen is absorbed on the $Ca_{0.4}M_{0.6}Ni_5$ alloy at a pressure slightly below 58 atmospheres and a temperature of about 322° K. which is maintained in the reactor by removing the heat of absorption of about 11,300 Joules/gm $H_2$. State C is where the $Ca_{0.4}M_{0.6}Ni_5$ hydride is dehydrided at 10 atmospheres pressure and a Table II

| Phase | Reactor 12 | Reactor 14 | Reactor 16 | Reactor 18 |
|---|---|---|---|---|
| Dehydriding/Activating | | | | |
| Valves Opened | 38, 310 | 40, 312 | 42, 314 | 44, 316 |
| Valves Closed | 70, 380 | 72, 382 | 74, 384 | 76, 386 |
| Hydriding/Deactivating | | | | |
| Valves Opened | 70, 380 | 72, 382 | 74, 384 | 76, 386 |
| Valves Closed | 38, 310 | 40, 312 | 42, 314 | 44, 316 |
| | Reactor 112 | Reactor 114 | Reactor 116 | Reactor 118 |
| Dehydriding/Activating | | | | |
| Valves Opened | 170, 388 | 172, 390 | 174, 392 | 176, 394 |
| Valves Closed | 138, 350 | 140, 352 | 142, 354 | 144, 356 |
| Hydriding/Deactivating | | | | |
| Valves Opened | 138, 350 | 140, 352 | 142, 354 | 144, 356 |
| Valves Closed | 170, 388 | 172, 390 | 174, 392 | 176, 394 |
| | Reactor 212 | Reactor 214 | Reactor 216 | Reactor 218 |
| Dehydriding/Activating | | | | |
| Valves Opened | 270, 358 | 272, 360 | 274, 362 | 276, 364 |
| Valves Closed | 238, 328 | 240, 330 | 242, 332 | 244, 334 |
| Hydriding/Deactivating | | | | |
| Valves Opened | 238, 328 | 240, 330 | 242, 332 | 244, 334 |
| Valves Closed | 270, 358 | 272, 360 | 274, 362 | 276, 364 |

From the foregoing description of the method of operation of the refrigeration cycle of the present invention, it will be perceived that the systems of this invention provide a highly efficient method of continously providing a refrigeration heat sink. Heat exchangers 122 and 222 provide refrigeration sinks of 24,900 Joules/gm $H_2$ at 273° K. Heat exchangers 22, 120, and 220 provide thermal energy of 40,900 Joules/gm $H_2$ at 322° K. Thermal energy of 16,000 Joules/gm $H_2$ must be supplied at 474° K. to heat exchanger 20. With no account being made for sensible heat effects, the ideal E.U.F. for these systems is 4.1. The maximum efficiency of a refrigeration absorption cycle operating at the described temperature is, by the Carnot analogy, 1.79. The ideal limit for the $CaNi_5$ alloy systems is $24,900/16,000=1.55$ or 86 percent of the Carnot limit.

Figure 2:
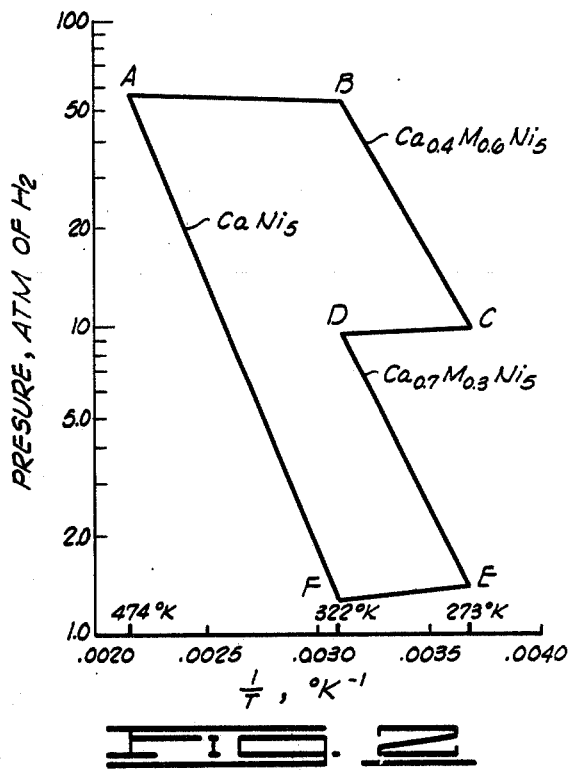
FIG. 2 is a pressure-temperature diagram of a three component $CaNi_5$ based system operating in a refrigeration mode.

FIG. 2 of the drawings shows the equilibrium states of the $CaNi_5$ hydride, $Ca_{0.7}M_{0.3}Ni_5$ hydride, and the $Ca_{0.4}M_{0.6}Ni_5$ hydride. These states represent the equilibrium pressure of the hydrogen and the equilibrium temperature. State A for the $CaNi_5$ hydride is at a temperature of 474° K. and 58 atmospheres. In the refrigeration temperature of 273° K. The heat of desorption is about 11,300 Joules/gm $H_2$. The desorbed hydrogen is absorbed on the $Ca_{0.7}M_{0.3}Ni_5$ alloy at State D. Thermal energy of 13,600 Joules/gm $H_2$ is released at about 322° K. The $Ca_{0.7}M_{0.3}Ni_5$ hydride is dehydrided at 273° K. and 1.5 atmospheres at State E. The heat of desorption is 13,600 Joules/gm $H_2$. The hydrogen is absorbed in the $CaNi_5$ alloy. Thermal energy of 16,000 Joules/gm $H_2$ is released at about 322° K. Upon activating the $CaNi_5$ hydride, the cycle is complete.

Operation in the heat pump mode requires the same reactor steps as in Table I. The valve sequence for this mode of operation is shown in Table III. The heat exchangers 22, 120, and 220 of FIG. 1 now serve to supply heat to their respective systems. Heat exchangers 122 and 222 serve to remove heat from their respective systems. Heat exchanger 20 removes the heat of absorption in system 10 which is the heat pump effect. System 10 is therefore the mechanical refrigeration equivalent while systems 110 and 210 are the heat engine equivalent.

Table III

| Phase | Reactor 12 | Reactor 14 | Reactor 16 | Reactor 18 |
|---|---|---|---|---|
| Dehydriding/Activating | | | | |
| Valves Opened | 70, 380 | 72, 382 | 74, 384 | 76, 386 |
| Valves Closed | 38, 310 | 40, 312 | 42, 314 | 44,316 |
| Hydriding/Deactivating | | | | |
| Valves Opened | 38, 310 | 40, 312 | 42, 314 | 44, 316 |
| Valves Closed | 70, 380 | 72, 382 | 74, 384 | 76, 386 |
| | Reactor 112 | Reactor 114 | Reactor 116 | Reactor 118 |
| Dehydriding/Activating | | | | |
| Valves Opened | 138, 350 | 140, 352 | 142, 354 | 144, 356 |
| Valves Closed | 170, 388 | 172, 390 | 174, 392 | 176, 394 |
| Hydriding/Deactivating | | | | |

Table III-continued

| Valves Opened | 170, 388 | 172, 390 | 174, 392 | 176, 394 |
|---|---|---|---|---|
| Valves Closed | 138, 350 | 140, 352 | 142, 354 | 144, 356 |
| | Reactor 212 | Reactor 214 | Reactor 216 | Reactor 218 |
| Dehydriding/Activating | | | | |
| Valves Opened | 238, 328 | 240, 330 | 242, 332 | 244, 334 |
| Valves Closed | 270, 358 | 272, 360 | 274, 362 | 276, 364 |
| Hydriding/Deactivating | | | | |
| Valves Opened | 270, 358 | 272, 360 | 274, 362 | 276, 364 |
| Valves Closed | 238, 328 | 240, 330 | 242, 332 | 244, 334 |

Figure 3:
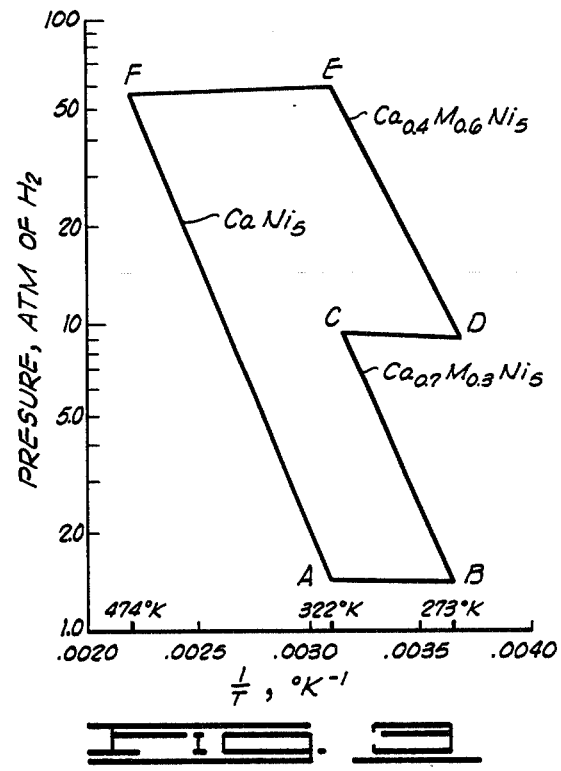
FIG. 3 is a pressure-temperature diagram of a three component $CaNi_5$ based system operating so as to achieve a heat pump effect.

FIG. 3 shows the heat pump mode being operated at the same temperature levels as the refrigeration mode. Beginning at State A, thermal energy of 16,000 Joules/gm $H_2$ from heat exchanger 22 is supplied to a reactor in system 10. Hydrogen is desorbed at a pressure of 1.5 atmospheres and absorbed on the $Ca_{0.7}M_{0.3}Ni_5$ alloy which is State B. Thermal energy of 13,600 Joules/gm $H_2$ is removed at slightly less than 273° K. by heat exchanger 122. At State C, the $Ca_{0.7}M_{0.3}Ni_5$ hydride is dehydrided at a pressure of 10 atmospheres as thermal energy of 13,600 Joules/gm $H_2$ is supplied at 322° K. from heat exchanger 120. The desorbed hydrogen is absorbed on the $Ca_{0.4}M_{0.6}Ni_5$ alloy and thermal energy of 11,300 Joules/gm $H_2$ at slightly less than 273° K. is removed by heat exchanger 222. At State E, the $Ca_{0.4}M_{0.6}Ni_5$ hydride is dehydrided by thermal energy of 11,300 Joules/gm $H_2$ from heat exchanger 220. The pressure is about 58 atmospheres and the temperature is about 322° K. The desorbed hydrogen is absorbed on the $CaNi_5$ alloy and thermal energy of 16,000 Joules gm $H_2$ is removed by heat exchanger 20 at a temperature slightly less than 474° K. This amount of thermal energy is the heat pump effect. Upon cooling the $CaNi_5$ hydride down to State A, the cycle is completed.

The ideal E.U.F. of the $CaNi_5$ based hydride absorption system is 16,000/40,900=0.39. The Carnot efficiency of a heat engine cycle operating between 322° K. and 273° K. is 0.15. The Coefficient of Performance of a heat pump operated between 474° K. and 322° K. is 3.1. The maximum E.U.F. possible from a Carnot system would be 0.465. Thus the ideal E.U.F. of the $CaNi_5$ system is 84 percent of the Carnot limit.

Figure 4:
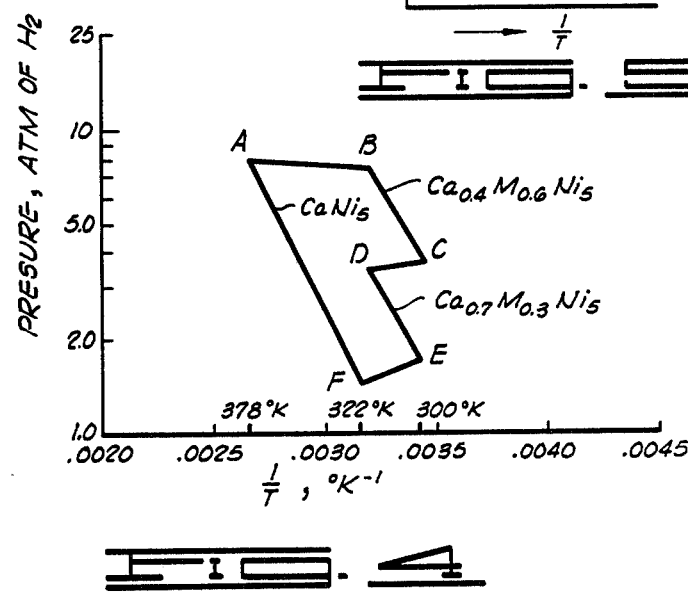
FIG. 4 is a pressure-temperature diagram of a $CaNi_5$ based system operating as a refrigeration mode where the refrigeration load is the heat rejected in a power cycle.

FIG. 4 is a pressure-temperature diagram for a $CaNi_5$ based system in a refrigeration mode. This system operates between the temperature of 378° K. (80° F.) with heat rejection at 322° K. (120° F.). When this system is operated in conjunction with a heat engine cycle operating between 378° K. and slightly higher than 300° K., the energy rejected could be used as the heat input in the refrigeration mode at 300° K. Then in the refrigeration cycle, heat would be rejected at 322° K. In effect, what was originally described as a refrigeration cycle has now become a heat pump. Since a heat pump cycle is actually a refrigeration cycle, the energy rejected of the refrigeration cycle has become useful, and the refrigeration load is the energy rejected in the power cycle. By allowing the heat engine cycle to reject energy at 300° K. to the refrigeration cycle, the efficiency is increased 25 percent over a temperature of 322° K. for energy rejection. Thus a combined power cycle and the refrigeration cycle allows for increased efficiency in the power cycle and energy rejected at a more useful temperature such as 322° K. which could be used for heating a home. At State A, 16,000 Joules/gm $H_2$ must be supplied as the heat of absorption. States B, D, and F reject heat of 44,400 Joules/gm $H_2$. At States C and E, 28,400 Joules/gm $H_2$ must be supplied as the heat of absorption. If the energy rejected from the power cycle is considered as one unit of thermal energy which is used as the input to the refrigeration cycle, then 1.56 units of thermal energy are rejected at 322° K. and the thermal input at 378° K. is 0.56 units of thermal energy. The power cycle would operate at 20 percent efficiency and therefore would require 1.20 units of energy at 378° K. The total input of energy at 378° K. would be 1.76 units.

In the refrigeration mode of operation, an equivalent heat engine cycle is operated between a high temperature thermal source and a low temperature thermal sink by one hydride component. Refrigeration is then achieved by two or more other hydride component systems. The higher the temperature difference between thermal source and sink, the more it will become a necessity to use two or more hydride components to approach maximum possible refrigeration output. The added hydride components allow pressure levels to remain relatively close between component systems when hydriding and dehydriding. A small pressure difference is necessary for hydriding and dehydriding, but a pressure difference much larger than necessary is wasteful.

In the heat pump mode, small differences in temperature levels between thermal source and sink can be used to advantage by two or more hydride components used in an equivalent heat engine cycle. In effect several inefficient heat engine equivalent systems are operated between the thermal source and sink to obtain a high temperature thermal output from the hydride component system operating as the mechanical refrigeration equivalent. Again the use of the several hydride components allows more efficient use of the available energy.

Figure 5:
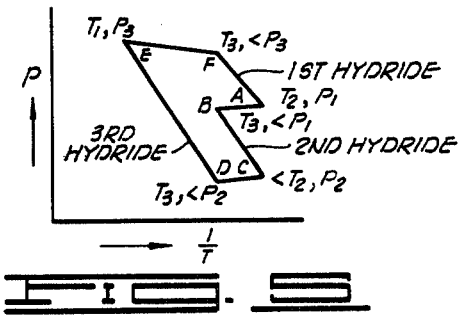
FIG. 5 is a general pressure-temperature diagram showing the manner in which the principles of the invention are used for improving the efficiency of a power cycle.

FIG. 5 of the drawings shows a system in which the principles of the invention are used for improving the efficiency of a power cycle by combining with the power cycle, a hydrogen absorption system including three subsystems of the character hereinbefore described. Each of these subsystems typically contains a plurality of hydride-dehydride reactors. Assuming a power cycle in which an energy conversion device is present for converting a portion of input thermal energy to work, while rejecting the remainder of the thermal energy, a portion of this rejected thermal energy is utilized to dehydride a first hydride material, which first hydride material is in equilibrium at state A, as shown in FIG. 5, at temperature $T_2$ and pressure $P_1$. The thus desorbed hydrogen gas is absorbed by a second hydridable material in one of the reactors in a second of the subsystems at temperature $T_3$, and at a pressure which is slightly less than $P_1$. This state of the second hydridable material is state B on the pressure-temperature diagram of FIG. 5.

The second hydride thus formed is cooled at constant volume to a temperature which is slightly less than $T_2$ at a pressure $P_2$ which is less than $P_1$ (state C). The cooled second hydride, which has been cooled to state C, is then heated by the use of another portion of the thermally rejected energy of the energy conversion device to desorb and supply hydrogen gas to a third hydridable material in a reactor of a third of the subsystems. A third hydride is thus formed which is saturated with hydrogen gas and is in equilibrium at a temperature of $T_3$ and a pressure which is slightly lower than $P_2$ (as shown at state D in the pressure-temperature diagram). This third hydride material is heated, while retaining the volume thereof constant, to a temperature of $T_1$ and a pressure of $P_3$, and in this manner is made to attain state E of the diagram. Continuing to heat the third hydride material at the temperature $T_1$ and a constant pressure of $P_3$, while releasing the volumetric restriction or confinement on this hydride, allows hydrogen gas to be desorbed from the third hydride, and the hydrogen gas thus desorbed can then be transferred to the reactor containing the first hydridable material to form the first hydride at a temperature $T_3$ and at a pressure slightly less than $P_3$ as signified by state F in FIG. 5.

Although certain preferred embodiments of the invention have been herein described in order to illustrate the principles of the invention, it will be understood that various changes and innovations in the illustrated and described embodiments can be effected without departure from the basic principles of the invention. Thus, the refrigeration may operate at a low temperature so that gases may be liquefied. All such changes are deemed to be circumscribed by the spirit and scope of the invention, except as the same may necessarily be limited by the appended claims or reasonable equivalents thereof.

What is claimed is:

1. An absorption system comprising:
   a first hydride-dehydride subsystem including first reactor means;
   a first hydridable material in said first reactor means for forming a first hydride by reaction with hydrogen gas;
   a second hydride-dehydride subsystem including second reactor means;
   a second different hydridable material in said second reactor means for forming a second hydride by reaction with hydrogen gas;
   a third hydride-dehydride subsystem including third reactor means;
   a third still different hydridable material in said third reactor means for forming a third hydride by reaction with hydrogen gas;
   hydrogen;
   means for periodically transferring hydrogen gas in circuit among said first, second and third reactor means;
   means for supplying heat to said first, second and third reactor means in alternating sequence for effecting chemical compression and dehydriding of the hydrides of said first, second and third hydridable materials; and
   means for removing heat from the reactor means in each of said subsystems.

2. An absorption system as defined in claim 1 wherein said first hydridable material contained in said first reactor means of said first subsystem is capable of producing an equilibrium pressure of hydrogen lower than the equilibrium pressure which can be produced by said second hydridable material in said second reactor means of said second subsystem and by said third hydridable material in said third reactor means of said third subsystem when all hydridable materials are at the same equilibrium temperature; and wherein said second hydridable material contained in said second reactor means of said second subsystem is capable of producing an equilibrium pressure of hydrogen lower than the equilibrium pressure which can be produced by said third hydridable material in said third reactor means of said third subsystem when both said second and third hydridable materials are at the same equilibrium temperature.

3. An absorption system as defined in claim 2 wherein said first, second and third reactor means each contains a hydridable material selected from the group consisting of nickel-magnesium alloys, iron-titanium alloys, vanadium-silicon alloys, lanthanum-nickel alloys, and calcium-nickel alloys.

4. An absorption system as defined in claim 3 wherein said first hydridable material is $CaNi_5$ alloy, said second hydridable material is $Ca_{0.7}M_{0.3}Ni_5$ where M is a Mischmetal of rare earth elements, and said third hydridable material contained in the third reactor means of said third subsystem is $Ca_{0.4}M_{0.6}Ni_5$ alloy.

5. An absorption system as defined in claim 1 wherein said means for supplying heat to said first, second and third reactor means comprises:
   heat exchanger means;
   pump means connected to said heat exchanger means; and
   a valve-containing conduit system connected between said circulator means, said heat exchanger means and said first, second and third reactor means for circulating a hydrogen gas heat exchange fluid from said heat exchanger means and said pump means to said reactor means.

6. An absorption system as defined in claim 1 wherein said means for removing heat from each of the subsystem reactor means comprises:
   a heat exchanger;
   pump means connected to said heat exchanger; and
   a conduit system containing valving and connected between said pump means, heat exchanger and each reactor means of each of said subsystems for circulating hydrogen gas among the heat exchanger, pump means and reactor means of the respective subsystems.

7. An absorption system as defined in claim 1 wherein said means for periodically transferring hydrogen gas in circuit among said first, second and third subsystems comprises a conduit and valving system connected among said first, second and third subsystems.

8. A method for deriving refrigeration from a hydrogen absorption system which includes three subsystems each containing a plurality of hydride-dehydride reactors, which method comprises:
   combining hydrogen gas with a first hydride-forming material in at least one reactor of a first of said subsystems under conditions of a temperature, $T_1$, and a pressure, $P_1$, such that a first hydride is formed;
   concurrently supply the thus combined hydrogen gas by desorbing hydrogen gas from a second hydride of a second hydride-forming material in at least one reactor of a second of said subsystems at a refrigeration temperature, $T_2$, lower than $T_1$, and a pressure, $P_2$, greater than $P_1$, wherein the heat necessary to desorb the hydrogen from the second hydride of the second hydride-forming material is part of the refrigeration load; then heating said first hydride at constant volume to a temperature, $T_3$, and a pressure, $P_3$, which are higher than $T_1$ and $P_1$;

combining hydrogen gas with a third hydride-forming material in at least one reactor of the third of said subsystems under conditions of temperature, $T_1$, and a pressure less than $P_3$ such that a third hydride is formed;

concurrently supplying the hydrogen gas thus combined with said third hydride-forming material by desorbing the hydrogen gas from said first hydride in at least one reactor of said first subsystem at a thermal input desorption temperature, $T_3$;

cooling said third hydride at constant volume to a temperature, $T_2$, and a pressure, $P_4$, which is intermediate the pressures $P_2$ and $P_3$;

combining hydrogen gas with said second hydride-forming material in said second subsystem under conditions of a temperature $T_1$ and a pressure slightly less than $P_4$, such that said second hydride is formed;

concurrently supplying the hydrogen gas thus combined with said second hydride-forming material by desorbing the hydrogen gas from said third hydride in a reactor of the third subsystem at a desorption temperature, $T_2$, wherein the heat necessary to desorb the third hydride is part of the refrigeration load;

cooling the second hydride at a constant volume to a temperature, $T_2$, and a pressure $P_2$; and cyclically repeating the foregoing steps.

9. A method as defined in claim 8 wherein said first hydride-forming material is capable of producing an equilibrium pressure of hydrogen lower than the equilibrium pressure of said second hydride-forming material when both said first and second hydride-forming materials are at the same equilibrium temperature; and
wherein said second hydride-forming material is capable of producing an equilibrium pressure of hydrogen lower than said third hydride-forming material when both said second and said third hydride-forming materials are at the same equilibrium temperature.

10. A method as defined in claim 9 wherein the reactors of each of said subsystems contain a hydride-forming material selected from the group consisting of nickel-magnesium alloys, iron-titanium alloys, vanadium-silicon alloys, lanthanum-nickel alloys, and calcium-nickel alloys.

11. A method as defined in claim 9 wherein said first hydride-forming material is CaNi$_5$, the second hydride-forming material is Ca$_{0.7}$M$_{0.3}$Ni$_5$, where M is a Mischmetal of rare earth metals, and the third hydride-forming material is Ca$_{0.4}$M$_{0.6}$Ni$_5$.

12. A method for deriving a heat pump effect from a hydrogen absorption system comprising:
combining hydrogen gas with a first hydridable material under conditions of temperature, $T_1$, and pressure, $P_1$, such that a first hydride is formed;
concurrently supplying the thus combined hydrogen gas by desorbing the hydrogen gas from a second hydride derived from a second hydridable material, said desorption from said second hydride being at a hydrogen gas temperature, $T_2$, higher than $T_1$, and a pressure, $P_2$, greater than $P_1$;

heating said first hydride at constant volume to a temperature $T_2$ and a pressure $P_3$, greater than $P_2$;

combining hydrogen gas with a third hydridable material under conditions of temperature, $T_1$, and a pressure lower than $P_3$, such that a third hydride is formed;

concurrently supplying the thus combined hydrogen gas by desorbing hydrogen gas from said first hydride at a temperature $T_2$, and a pressure, $P_3$;

heating said third hydride at constant volume to a temperature, $T_2$, and a pressure, $P_4$, which is greater than $P_3$;

combining hydrogen gas with said second hydridable material under conditions of a temperature, $T_3$, which is substantially higher than $T_2$, and a pressure lower than $P_4$, such that said second hydride is formed;

concurrently supplying the thus combined hydrogen gas by desorbing hydrogen gas from said third hydride at a temperature, $T_2$, and a pressure, $P_4$;

cooling said second hydride at constant volume, to a temperature, $T_2$, and a pressure, $P_2$; and cyclically repeating the foregoing steps.

13. A method as defined in claim 12 wherein said second hydridable material is capable of producing an equilibrium pressure of hydrogen lower than said first and third hydridable materials when both said first, second and third hydridable materials are at the same equilibrium temperature; and
wherein said first hydridable material is capable of producing an equilibrium pressure of hydrogen lower than said third hydridable material when both said first and third hydridable materials are at the same equilibrium temperature.

14. A method as defined in claim 12 wherein said hydridable materials are selected from the group consisting of nickelmagnesium alloys, iron-titanium alloys, vanadium-silicon alloys, lanthanum-nickel alloys, and calcium-nickel alloys.

15. A method as defined in claim 14 wherein said second hydridable material is CaNi$_5$, said first hydridable material is Ca$_{0.7}$M$_{0.3}$Ni$_5$, where M is a Mischmetal of rare earth metals, and said third hydridable material is Ca$_{0.4}$M$_{0.6}$Ni$_5$.

16. A method for deriving refrigeration from a hydrogen absorption system comprising:
establishing a first group of first reaction zones having a first hydridable material in at least one of said first reaction zones, and a hydride derived from said first hydridable material in another of said first reaction zones;
establishing a second group of second reaction zones having a second hydridable material in at least one of said second reaction zones, and a hydride derived from said hydridable material in at least one other of said second reaction zones, said second hydridable material having a capability of producing, upon hydriding, an equilibrium pressure of hydrogen higher than the equilibrium pressure of hydrogen produced by said first hydridable material in said first reaction zones, upon hydriding, when both said first and second hydridable materials are at the same equilibrium temperature after hydriding;
establishing a third group of third reaction zones having a third hydridable material in at least one of said third reaction zones, and a hydride formed from said third hydridable material in at least one other of said third reaction zones, said third hydridable material having a capability of producing, upon hydriding, an equilibrium pressure of hydrogen higher than the equilibrium pressure of hydrogen produced by said second hydridable material in said second reaction zones, upon hydriding, when both said second and third hydridable materials are at the same equilibrium temperature after hydriding;

transferring heat from a refrigeration medium to one of said second reaction zones containing the derived hydride of said second hydridable material to desorb hydrogen gas therefrom at a refrigeration temperature, $T_2$, and a pressure, $P_2$, wherein the heat necessary to desorb hydrogen gas from the derived hydride of the second hydridable material is part of the refrigeration load;

transferring desorbed hydrogen gas from said one second reaction zone containing derived hydride of said second hydridable material undergoing desorption of the hydrogen gas from the derived hydride therein by the cooling of said refrigeration medium, to the first hydridable material in one of said first reaction zones;

combining said transferred hydrogen gas with said first hydridable material in said one of said first reaction zones under conditions of a temperature, $T_1$, and a pressure, $P_1$, which is less than $P_2$, such that a hydride is formed of said first hydridable material in said one of said first reaction zones which is in equilibrium with hydrogen gas with concurrent exothermal release of thermal energy; then increasing, at constant volume, the temperature of the formed hydride material formed in said one of said first reaction zones by supplying external thermal energy to raise the temperature thereof to a temperature, $T_3$, and the pressure thereof to a pressure $P_3$, which temperature, $T_3$, and pressure, $P_3$, are higher than $T_2$ and $P_1$, respectively;

terminating the constant volume restriction on the formed hydride of said first hydridable material in said one of said first reaction zones of said first group, and concurrently desorbing hydrogen gas therefrom by continuing to heat the formed hydride of said first hydridable material in said one reaction zone of said first group at a temperature, $T_3$, and a pressure, $P_3$, with concurrent volumetric expansion of the thus desorbed hydrogen gas;

transferring the desorbed hydrogen gas from said one of said first reaction zones of said first group of reaction zones to the third hydridable material in said one of other reaction zones of said third group of reaction zones;

combining said last-mentioned transferred hydrogen gas with said third hydridable material in one of said third reaction zones of said third group and maintaining an equilibrium pressure lower than $P_3$ by transferring heat from said one of said third reaction zones to an external heat exchange medium to thereby form a third hydride from said third hydridable material;

decreasing, at constant volume, the temperature in said one of said third reaction zones of said third group to a temperature, $T_2$, and a pressure, $P_4$, which pressure, $P_4$, is intermediate pressures $P_1$ and $P_3$;

terminating the constant volume restriction on the formed third hydride of said third hydridable material in said one reaction zone of said third group, and concurrently desorbing hydrogen gas therefrom by transferring heat from a refrigeration medium to said one reaction zone of said third group at a refrigeration temperature, $T_2$, and a pressure, $P_4$, wherein the heat necessary to desorb hydrogen gas from the formed third hydride of the third hydridable material is a part of the refrigeration load;

transferring the desorbed hydrogen gas from said third reaction zone containing a formed hydride of said third hydridable material undergoing hydrogen desorption to said second hydridable material in one of said second reaction zones;

combining said transferred hydrogen gas with said second hydridable material in said one of said second reaction zones under conditions of temperature, $T_1$, and a pressure which is slightly less than $P_4$, such that a hydride of said second hydridable material in said one of said second reaction zones which is in equilibrium with hydrogen gas is formed with concurrent exothermal release of thermal energy; then decreasing, at constant volume, the temperature in said one reaction zone of said second group which contains the formed hydride formed from said second hydridable material to a temperature, $T_2$, and a pressure, $P_2$; and cyclically repeating the foregoing steps which follow the steps of establishing said groups of reaction zones.

17. A method for improving efficiency in power cycles by combining with a power cycle, a hydrogen absorption system which includes three subsystems, each subsystem containing a plurality of hydride-dehydride reactors, which method comprises:

supplying an amount of thermal energy at a temperature, $T_1$, to an energy conversion power system in which a portion of said thermal energy input is converted to a form of work and the remainder of the thermal energy is rejected at a temperature, $T_2$;

concurrently utilizing a portion of said rejected energy at the temperature, $T_2$, to dehydride a first hydride of a first hydridable material in one of said reactors of one of said subsystems at a pressure, $P_1$, and at a temperature less than $T_2$ with the desorbed hydrogen gas being absorbed by a second hydridable material in one of said reactors in a second of said subsystems at a temperature, $T_3$, which is intermediate the temperatures $T_1$ and $T_2$, and at a pressure less than $P_1$ to form a second hydride material;

cooling said second hydride material at constant volume to a temperature less than $T_2$ and a pressure, $P_2$, less than $P_1$;

combining hydrogen gas with a third hydridable material in one of said reactors in the third of said subsystems under conditions of temperature, $T_3$, and a pressure lower than $P_2$, such that a third hydride is formed, as the hydrogen is desorbed from said second hydride material at a temperature, $T_2$, and a pressure, $P_2$, with the thermal energy for desorption of said second hydride material being at least a part of the remainder of said thermally rejected energy of the energy conversion power system;

heating said third hydride material at constant volume to a temperature, $T_1$, and a pressure, $P_3$;

combining hydrogen gas with said first hydridable material at a temperature, $T_3$, and a pressure less than $P_3$, such that said first hydride is formed, as the hydrogen gas is desorbed from said third hydride material at a temperature, $T_1$, and a pressure, $P_3$, with the thermal energy of desorption supplied at a temperature greater than $T_3$;

cooling said first hydride material to a temperature $T_2$, and a pressure, $P_1$; and cyclically repeating the foregoing steps.

18. An absorption system comprising:

at least three hydride-dehydride subsystems, each subsystem including reactor means and a hydridable material in said reactor means, the hydridable material in each reactor means being different from the hydridable materials in each of the other reactor means;

hydrogen;

means for transferring hydrogen gas in circuit among said reactor means of said subsystems;

means for supplying heat to said reactor means in said subsystems in alternating sequence for effecting chemical compression and dehydriding of hydrides formed in said reactor means; and means for removing heat from the reactor means in each of said subsystems.

* * * * *